United States Patent [19]

Thorpe et al.

[11] Patent Number: 5,288,921
[45] Date of Patent: Feb. 22, 1994

[54] PROCESS FOR REDUCING UNSATURATION ON POLYOLS

[75] Inventors: David Thorpe, Erps-Kwerps; Giovanni Parrinello, Duisburg, both of Belgium

[73] Assignee: Imperial Chemical Industries PLC, London, England

[21] Appl. No.: 21,833

[22] Filed: Feb. 24, 1993

Related U.S. Application Data

[63] Continuation-in-part of Ser. No. 899,566, Jun. 16, 1992, abandoned.

[51] Int. Cl.$^5$ .................. C07C 41/34; C07C 41/38
[52] U.S. Cl. ........................ 568/621; 518/620
[58] Field of Search ..................... 568/621, 620

[56] References Cited

U.S. PATENT DOCUMENTS

| | | | |
|---|---|---|---|
| 3,461,169 | 8/1969 | Davis et al. | 260/611 |
| 3,478,109 | 11/1969 | McConnell | 260/611 |
| 4,279,073 | 7/1981 | Packer | 29/832 |
| 4,317,939 | 3/1982 | Gerlock et al. | 568/121 |
| 4,762,951 | 8/1988 | Mueller | 568/617 |
| 5,093,380 | 3/1992 | Takeyasu et al. | 521/131 |

FOREIGN PATENT DOCUMENTS

| | | |
|---|---|---|
| 0059594 | 9/1982 | European Pat. Off. |
| 0362688 | 4/1990 | European Pat. Off. |
| 0443614 | 8/1991 | European Pat. Off. |

OTHER PUBLICATIONS

Hopper, J., Parrinello, G., Parfondry, A., Kroesen, K., *Recent Developments in The Chemical Recycling of Flexible Polyurethanes*, ICI Polyurethanes, Utech 92 Conference, 1992.

*Primary Examiner*—Howard T. Mars

[57] ABSTRACT

The level of unsaturation in certain polyols can be reduced by extraction with certain low molecular weight polyols like ethylene glycol.

10 Claims, No Drawings

PROCESS FOR REDUCING UNSATURATION ON POLYOLS

CROSS REFERENCE TO RELATED APPLICATIONS

This application is a continuation-in-part of co-pending U.S. patent application Ser. No. 07/899.566, filed Jun. 16, 1992 now abandoned for "Process for Reducing Unsaturation in Polyols".

The invention is concerned with a process for preparing polyoxyalkylene polyols having reduced unsaturation.

It is known that in preparing polyoxyalkylene polyols by oxyalkylating, and in particular oxypropylating, an initiator having at least two hydroxyl groups some polymeric material is formed having allylic unsaturation at the end of the polymer chain due to a competition between an elimination reaction and the desired polymerisation; see e.g. EP 32688 and EP 443614. It is further known to reduce the amount of unsaturation by using a special catalyst, see EP 362688.

Surprisingly, it has been found that the level of unsaturation in certain polyoxyalkylene polyols can be reduced by extraction with certain low molecular weight polyols.

Consequently the invention is concerned with a process for reducing the level of unsaturation in a polyoxyalkylene polyol having a nominal number average molecular weight of 1000-25000 by bringing the polyol into contact with an extracting compound which is a polyol or a polyol mixture having a nominal number average molecular weight of at most 500 and being immiscible with the polyoxyalkylene polyol, mixing the extracting compound and the polyoxyalkylene polyol, allowing the extracting compound and the polyoxyalkylene polyol to separate and removing the extracting compound. Since the level of unsaturation in practice plays a significant role in those polyoxyalkylene polyols which comprise a certain amount of oxypropylene units, the polyoxyalkylene polyols preferably have at least 50 and most preferably at least 70% of oxypropylene units calculated on the total number of oxyalkylene units present in the polyol. The polyoxyalkylene polyols further preferably have a nominal average functionality of 2-8 most preferably of 2-6 and preferably a nominal number average molecular weight of 1500-10000. The process according to the invention may be applied to freshly prepared polyoxyalkylene polyols or to such polyols which have been obtained by chemical degradation of polyurethanes. The last types of polyols often have a higher aromatic diamine content than the first type of polyols. The process preferably is applied to polyoxyalkylene polyols having not more than 250 parts per million of aromatic diamine.

Consequently the invention preferably is concerned with a process for reducing the level of unsaturation in a polyoxyalkylene polyol having a nominal number average molecular weight of 1500-10.000, having a nominal average functionality of 2-6, having an oxypropylene (PO) content of 70-100% and comprising not more than 250 parts per million (ppm) of aromatic diamine by bringing the polyol into contact with an extracting compound which is a polyol or a polyol mixture having a nominal number average molecular weight of at most 500 and being immiscible with the polyoxyalkylene polyol, mixing the extracting compound and the polyoxyalkylene polyol, allowing the extracting compound and the polyoxyalkylene polyol to separate and removing the extracting compound.

Any of the polyoxyalkylene polyols known in the art having a molecular weight, a functionality, a PO content and an aromatic diamine content as indicated above may be used. The aromatic diamine content preferably is less than 100 ppm and most preferably less than 50 ppm. Specific aromatic diamines in this context are diamino diphenylmethane (DADPM) and toluene diamine (TDA).

Most preferably the functionality of the polyoxyalkylene polyol is 2-4. The polyol may be a polyoxypropylene polyol or a polyol comprising oxypropylene units together with one or more other oxyalkylene units provided the polyol does not contain more than 50 and preferably not more than 30% of other oxyalkylene units calculated on the total number of oxyalkylene units present in the polyol. Such copolymers may be block-copolymers or random-copolymers. A preferred other oxyalkylene unit is oxyethylene.

The extracting compounds preferably are selected from the group consisting of ethylene glycol, diethylene glycol, triethylene glycol, tetraethylene glycol, glycerol and butanediol and mixtures thereof; ethylene glycol and diethylene glycol and mixtures thereof being most preferred.

Immiscibility in the context of the present invention is defined as follows: an extracting compound is considered as immiscible if at most 20% by weight of the extracting compound can be dissolved in the polyoxyalkylene polyol at room temperature.

The extraction process is carried out as a conventional extraction process. It may be carried out batchwise or continuously. If the process is carried out batchwise this may be done once or preferably at least two and more preferably 2-10 times. The extraction process may be conducted at room temperature or at elevated temperature provided the temperature applied is lower than the boiling point of the extracting compound under the conditions applied and than the temperature at which the polyoxyalkylene polyol would disintegrate under the conditions applied. Once the polyol and the extracting compound have been combined they are mixed. This may be a normal mixing or a mixing under high shear conditions. The amount of extracting compound used may vary between wide ranges. Preferably the weight ratio of extracting compound and polyol is at least 0.25:1.

The reduction in unsaturation obtainable will depend inter alia upon the level of unsaturation present in the starting material, the extracting compound selected and the number of extraction steps applied. In general present commercial polyols have a level of unsaturation of 0.08-0.04 meq/g. By applying the process according to the present invention the unsaturation may be reduced by at least 10% of its original value; by applying the process according to the present invention batchwise more than once, e.g. 5 or 6 times, or continuously the unsaturation may be reduced by 50% of its original value or more.

The invention is illustrated by the following examples.

Example 1

The determination of the unsaturation level was done as follows:

25 ml of sample was added to 50 ml of a mercury acetate solution—was prepared by dissolving 40 g of mercury acetate in 1 l of methanol, adding 1.2 ml glacial acetic acid followed by filtration. The solution should be prepared freshly every week—and stirred to dissolve; then the container was closed and allowed to stand for 30 min; then 10 g of sodium bromide was added followed by stirring for 15 min; then the solution was titrated potentiometrically with 0.1N potassium hydroxide in methanol.

A blank was treated the same way only omitting the sample.

The unsaturation level is then calculated from the formula $$\frac{(V_{sample} - V_{blank}) \times f}{\text{weight of sample in grams}} = \text{unsaturation level}$$

in meq/g wherein V is the number of ml of KOH solution used in the titration and f is the normality of KOH.

A glycerol initiated PO/EO polyol (15.6% EO tip) having a nominal number average molecular weight of 6000, an aromatic diamine (DADPM) content of less than 50 ppm, an $OH_v$ of 28 mg KOH/g and an unsaturation level of 0.072 meq/g (polyol A) was mixed in a 1:1 weight ratio with ethylene glycol under high shear conditions (20.000 revolutions per minute) for 5 minutes. The mixing was started at room temperature and during the mixing the mixture was not cooled. Subsequently the mixture was allowed to stand for three days in order to allow the ethylene glycol to separate. Then the ethylene glycol layer was removed and the polyol was distilled on a thin film evaporator to remove residual ethylene glycol. The polyol obtained has an ethylene glycol content of <0.1% by weight, an OH value of 34 mg KOH/g and an unsaturation level of 0.055 meq/g. When polyol starting material (polyol A) was subjected to thin film evaporation only the unsaturation level was 0.070 meq/g, showing that this distillation has no significant effect on unsaturation reduction.

Example 2

The same polyol A was mixed under normal conditions with ethylene glycol in a 1:1 weight ratio at 80° C. for 30 minutes; then the mixture was allowed to stand for 15 minutes in order to allow the ethylene glycol to separate and the ethylene glycol layer was removed. This procedure was repeated twice followed by distillation of the polyol on a thin film evaporator in order to remove part of the residual ethylene glycol. The polyol obtained had an ethylene glycol content of 0.8% by weight, an OH value of 61 mg KOH/g and an unsaturation level of 0.049 meq/g.

Example 3

The same polyol A was used. Extraction was conducted with ethylene glycol using a CZAKO liquid/liquid continuous extractor for 8 hours. The temperature of the polyol was room temperature. Then the polyol was distilled on a thin film evaporator. The polyol obtained had an ethylene glycol content <0.1% by weight, an OH value of 32 mg KOH/g and an unsaturation level of 0.059 meq/g.

Example 4

65 kg of Polyol A was mixed in 1:1 weight ratio with diethylene glycol and under mixing and $N_2$ sparging heated to 200° C. in 1½ hours. Then the mixture was kept at 200° C. for 15 minutes while mixing. $N_2$ sparging and heating was stopped and the mixture was allowed to stand for 15 minutes. After that the mixture was cooled to 100° C. in 1 hour and allowed to stand overnight while the temperature remained between 60° and 100° C. Finally the bottom-layer was removed. This process was repeated another 4 times using fresh diethylene glycol. Finally the polyol was vacuum distilled at 180° C. Then the aforementioned extraction was repeated once again followed by vacuum distillation at 180° C. The polyol obtained (59 kg) has a diethylene glycol content of 0.1% by weight, an OH value of 29.5 mg KOH/g and an unsaturation level of 0.02 meq/g.

We claim:

1. A process for reducing the level of unsaturation in a polyoxyalkylene polyol having a nominal number average molecular weight of 1000–25000 by bringing the polyol into contact with an extracting compound which is a polyol or a polyol mixture having a nominal number average molecular weight of at most 500 and being immiscible with the polyoxyalkylene polyol, mixing the extracting compound and the polyoxyalkylene polyol, allowing the extracting compound and the polyoxyalkylene polyol to separate and removing the extracting compound.

2. A process for reducing the level of unsaturation in a polyoxyalkylene polyol having a nominal average molecular weight of 1500–10.000, having a nominal average functionality of 2–6, having an oxypropylene content of 70–100% and comprising not more than 250 parts per million of aromatic diamine by bringing the polyol into contact with an extracting compound which is a polyol or polyol mixture having a nominal average molecular weight of at most 500 and being immiscible with the polyoxyalkylene polyol, mixing the extracting compound and the polyoxyalkylene polyol, allowing the extracting compound and the polyoxyalkylene polyol to separate and removing the extracting compound.

3. Process according to claim 1 characterised in that the process is conducted in a continuous way.

4. Process according to claim 1 characterised in that the process is conducted 2–10 times batchwise.

5. Process according to claims 1 characterised in that the extracting compound is selected from the group consisting of ethylene glycol, diethylene glycol, triethylene glycol, tetraethylene glycol, glycerol, butanediol and mixtures thereof.

6. Process according to claim 1 characterised in that the extracting compound is selected from the group consisting of ethylene glycol, diethylene glycol and mixtures thereof.

7. A process according to claim 2 characterized in that the process is conducted in a continuous way.

8. A process according to claim 2 characterized in that the process is conducted 2–10 times batchwise.

9. A process according to claim 2 characterized in that the extracting compound is selected from the group consisting of ethylene glycol, diethylene glycol, triethylene glycol, tetraethylene glycol, glycerol, butanediol and mixtures thereof.

10. A process according to claim 2 characterized in that the extracting compound is selected from the group consisting of ethylene glycol, diethylene glycol and mixtures thereof.

* * * * *